United States Patent [19]

Haley et al.

[11] Patent Number: 4,515,255
[45] Date of Patent: May 7, 1985

[54] HYDRAULIC CONTROL SYSTEM FOR A CLUTCH AND TRANSMISSION

[75] Inventors: William J. Haley; Guenter J. Neumann, both of Sterling Heights, Mich.

[73] Assignee: Borg-Warner Corporation, Chicago, Ill.

[21] Appl. No.: 405,797

[22] Filed: Aug. 6, 1982

[51] Int. Cl.³ ............................................. B60K 41/22
[52] U.S. Cl. .................... 192/3.57; 192/3.61
[58] Field of Search .................... 192/3.57, 3.58, 3.61, 192/3.62, 3.63, 87.13, 51, 4 C, 48.4, 48.8

[56] References Cited
U.S. PATENT DOCUMENTS

| | | | |
|---|---|---|---|
| 2,932,371 | 4/1960 | Backus et al. | 192/3.57 |
| 3,083,801 | 4/1963 | Frohner | 192/3.57 |
| 3,344,896 | 10/1967 | Rasmussen | 192/3.57 |
| 3,365,035 | 1/1968 | Kress | 192/3.57 |
| 3,508,450 | 4/1970 | Richards | 192/3.57 |
| 3,557,918 | 1/1971 | Yoshida et al. | 192/3.57 |
| 3,664,470 | 5/1972 | Beech et al. | 192/3.57 |
| 3,946,842 | 3/1976 | Siebers et al. | 192/3.58 |

Primary Examiner—George H. Krizmanich
Attorney, Agent, or Firm—Florian S. Gregorczyk

[57] ABSTRACT

A fluid control system for a continuously variable transmission utilizing a first valve which is manually operable, and a second valve operable by a fluid motor which fluid motor also provides engagement and disengagement of two gear ratios. The first valve directs fluid flow from a fluid source to the fluid motor and to the second valve for communication to a fluid actuated starting clutch. Fluid for the clutch and fluid motor are only provided when the first valve is selectively engaged to the first or second operable gear ratios thereby directing fluid from the fluid source to the fluid actuated motor. The fluid motor is operable to move a gear engaging means and simultaneously move the second valve to an aligned port position permitting fluid flow to the starting clutch. The clutch is only engaged when the manually operated valve is in the first or second gear ratio position, therefore, independent park and neutral positions have been obviated by the fact that such a starting clutch is no longer providing power to an output means. In an alternative embodiment a pressure modulator valve is interposed between the fluid source and the first valve to control the line pressure to the fluid control system. The use of the starting clutch in this fashion obviates the use of a forward clutch to provide driving communication between input and output means.

10 Claims, 7 Drawing Figures

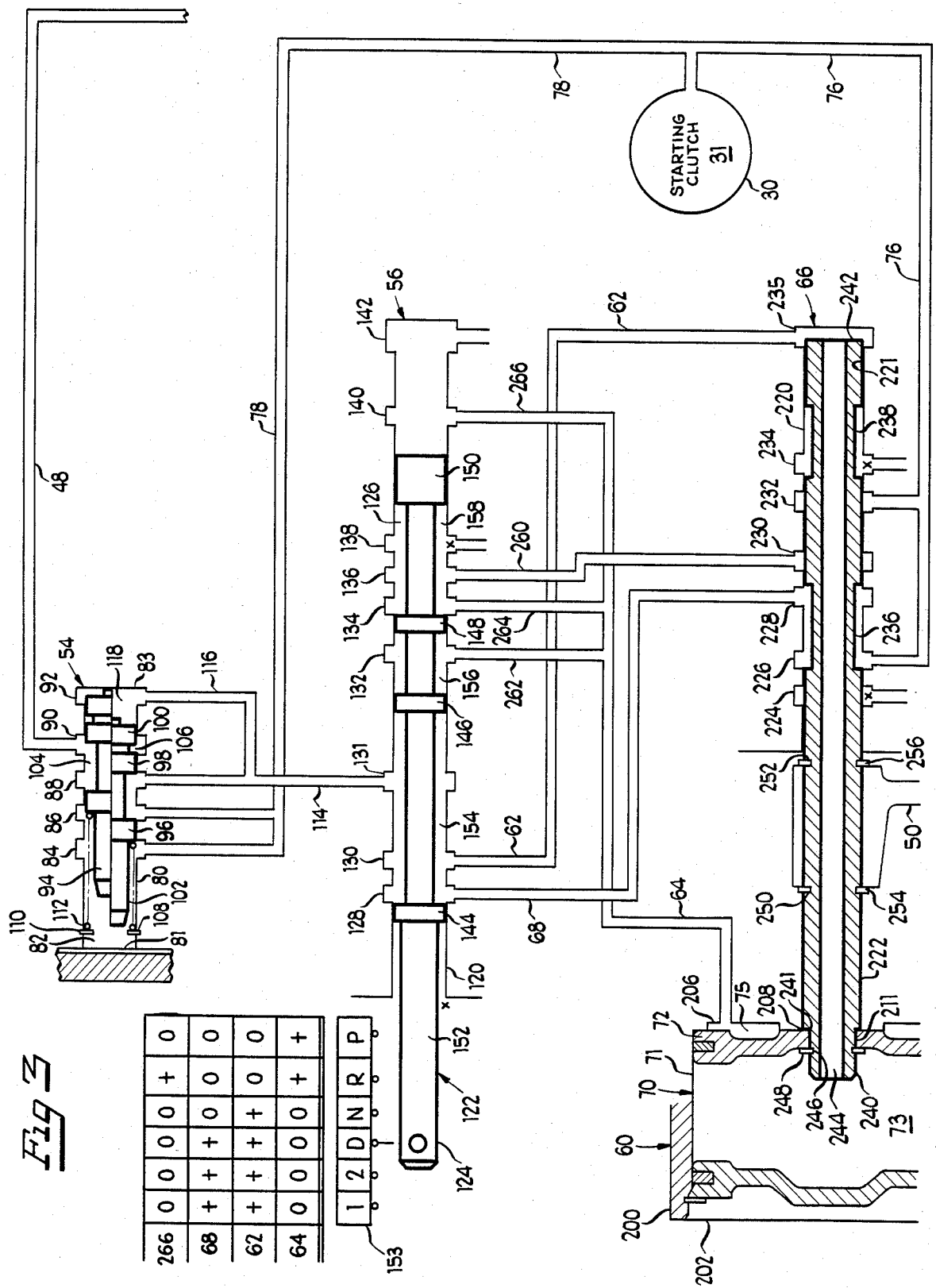

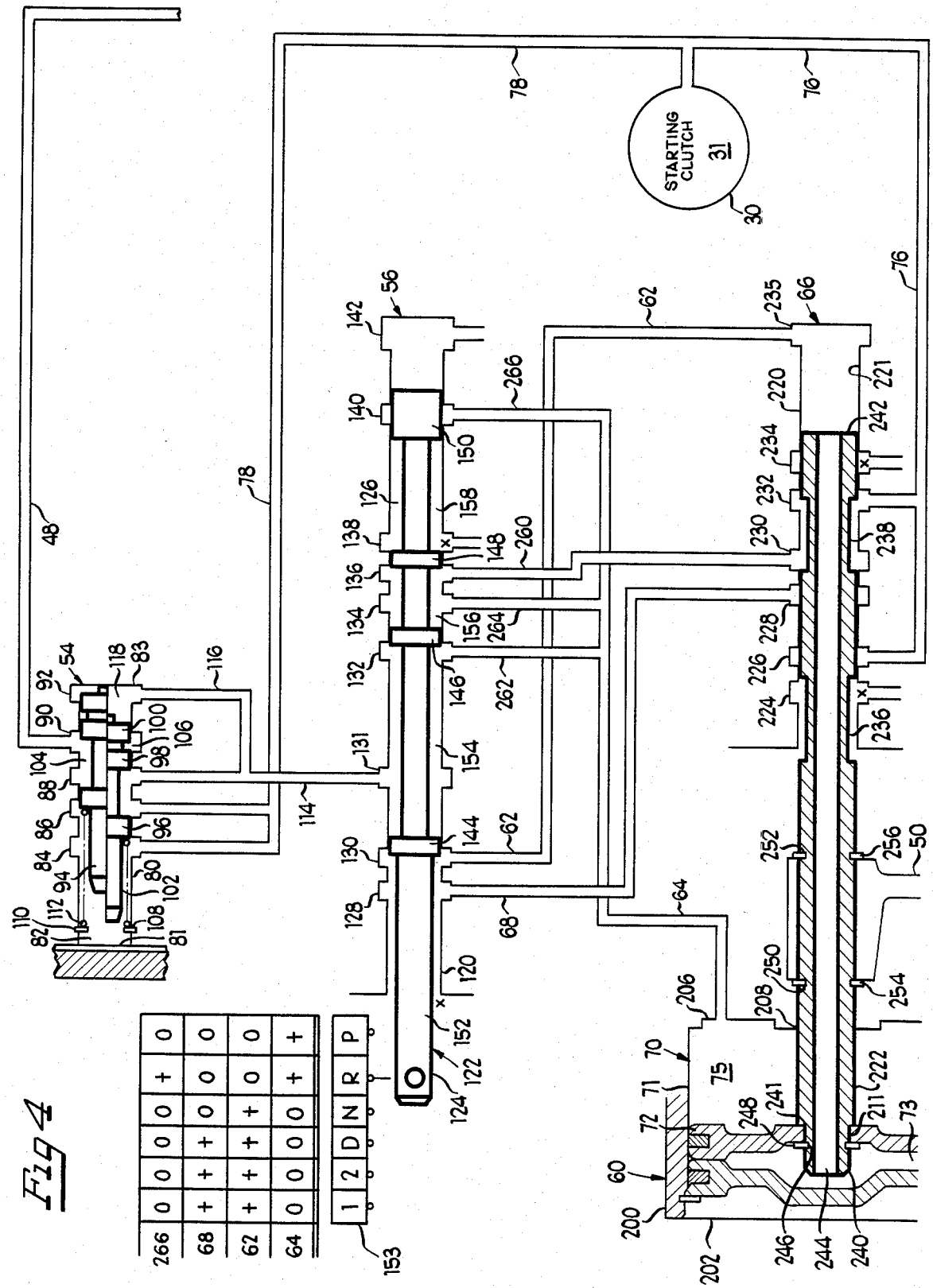

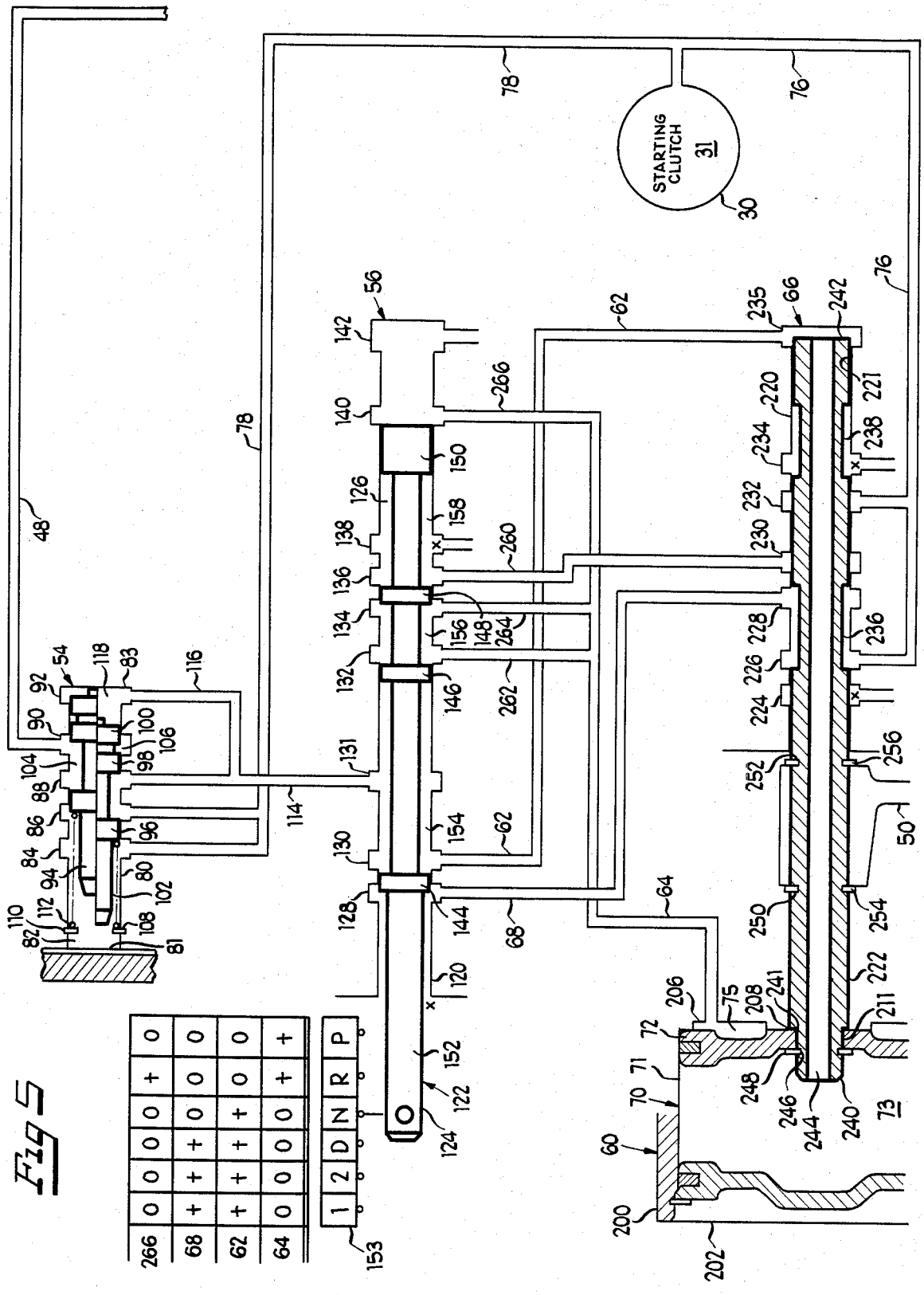

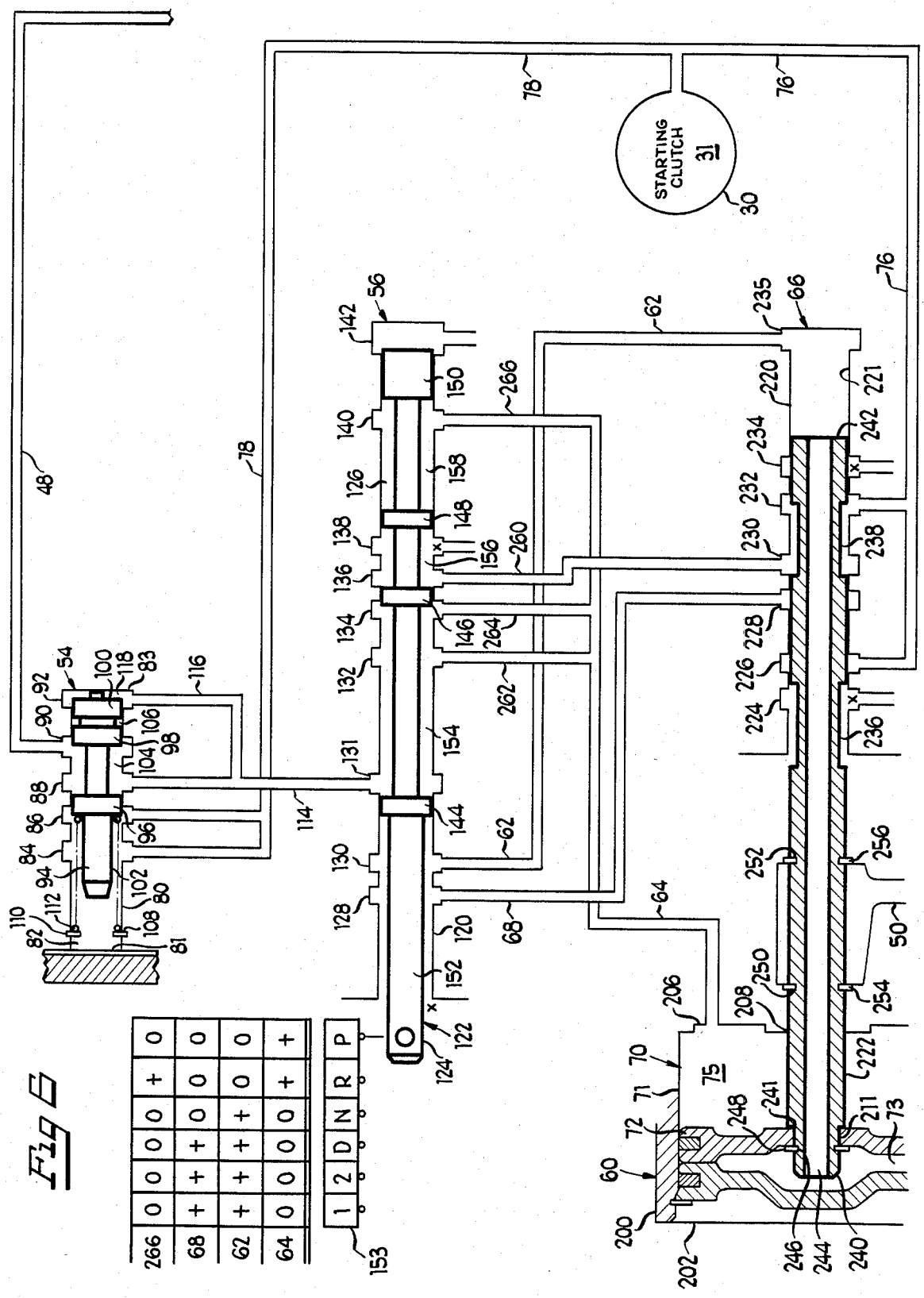

HYDRAULIC CONTROL SYSTEM FOR A CLUTCH AND TRANSMISSION

BACKGROUND OF THE INVENTION

1. Field

The present invention relates to a control mechanism for an automotive transmission. More specifically the invention encompasses a fluid control mechanism utilizing at least two control valves and a fluid motor in a fluid circuit to control the actuation of a fluid operable starting clutch and a gear engaging means.

2. Prior Art

The use of control valves to provide fluid flow for gear selection in an automotive transmission and for clutch actuation is known in the art and is shown in several configurations. These configurations include: (1) a slide valve responsive to changes in the acceleration pedal and controlling a forward clutch (U.S. Pat. No. 4,331,045); (2) a drive controlling mechanism with a shuttle valve for control of fluid to and from a parking brake for braking and releasing a rotary shaft of a hydraulic motor (U.S. Pat. No. 4,330,051); (3) a multi valve control mechanism including primary and secondary regulator valves, throttle modulator valve, manual control valve, a downshift valve, throttle valve, servo orifice control valve, two shaft valves and a drive control valve, as well as multiple brakes and clutches as taught in U.S. Pat. No. 3,118,320; (4) a fluid control mechanism for an infinitely variable transmission wherein one control is utilized to control pressure to one variable sheave and a second control valve is utilized to control fluid flow to a second variable sheave, as taught in U.S. Pat. No. 4,152,947. U.S. Pat. No. 4,098,148 discloses the utilization of a planetary overdrive gear mechanism for an automatic transmission, which control mechanism includes two servomotors for a controller and a brake mechanism and an interlock and further incorporates by reference U.S. Pat. No. 3,744,348 which defines a mutliple valve, multiple discrete-ratio gear automatic transmission which monitors a pressure signal that is a function of torque and vehicle speed, and the control circuit includes sequencing valves and servomotors. U.S. Pat. No. 3,115,049, teaches a multiple valve arrangement that is throttle responsive to condition the transmission to allow the engine to operate at a constant speed. U.S. Pat. No. 3,146,630 to Ivey, shows fluid actuated servomotors to change gear ratios in a multiple speed transmission which includes a torque converter and fluid retarder and is impliedly useful in trucks or tractors. U.S. Pat. No. 3,369,430, teaches a transmission control system utilizing a pressure regulating system for pressure control to the friction elements and showing a regulating valve effective at high speed drive ratio to delay the engagement of a servomotor to provide a smooth down-shift, the transmission having multiple gearing, a fluid torque converter and multiple clutches and brakes. U.S. Pat. No. 3,263,782 to Smirl et al., describes a clutch control mechanism responsive to engine speed and torque, and automatic disengagement and re-engagement of the clutch in response to a transmission shift means. U.S. Pat. No. 3,043,152, discloses a CVT control means for adjusting the gear ratio in response to a load on the driver gear (pulley), but does not suggest a change gear relation using a synchronizer and dual servomotor-slide valve control. U.S. Pat. No. 4,253,347, teaches a control system for controlling the gain constant in an orifice valve controlled by oil pressure from a governor valve dependent on rotational speed of an output shaft. U.S. Pat. No. 4,194,608, discloses a control for a countershaft transmission by providing electric control of a hydraulic transmission having multiple clutches and brakes, where the clutch assembly is operable between a coupled and an uncoupled condition by a clutch control valve which is also controlled by electric control means, and U.S. Pat. No. 4,331,046, teaches an automatic transmission control system including multiple discrete gear ratios, multiple clutches and brakes controlled by multiple valves and a valve network responsive to a manually operable valve.

SUMMARY OF THE INVENTION

The invention encompasses a fluid control mechanism utilizing at least two control valves and a fluid motor, coupled in a fluid circuit both to complete a flow path for the actuation of a fluid-operable starting clutch and to operate a gear-engaging means. The first of the control valves is manually operable between at least two positions (such as forward and reverse, or high ratio and low ratio) displayed on a transmission gear select lever (hand operable), to convey a pressurized fluid to the fluid motor, to the second control valve, and to the fluid-operable starting clutch when, and only when, one of the two positions is selected. The fluid path to energize the clutch for power transmission therethrough is only completed when the gear select lever, and thus the first control valve, is in one of the two positions. When the two positions are forward and reverse, the control system of this invention obviates the need for a neutral transmission position and/or park gear by preventing completion of the clutch-applying fluid path until the second control valve has virtually completed its movement and the gear-engaging means has been displaced to select an appropriate drive train. Further, this operable-only-in-gear system enables the clutch, by itself, to accomplish the functions previously requiring both a starting (slipping) clutch and a forward clutch in an automatic transmission. The gear positions may be forward and reverse, park and neutral, or different drive ratios. The gear engaging means can include a synchronizer assembly.

The fluid-actuated clutch provides slip between the last-selected and the newly-selected positions until the fluid motor has effected engagement of the newly-selected position or gear ratio. Movement of the fluid motor is provided by fluid flow through the first control valve. The fluid flow in the present invention may be at line pressure or at a regulated pressure by providing pressure control between the fluid source and the first control valve.

BRIEF DESCRIPTION OF THE DRAWINGS

In the figures of the drawings, like reference numerals identify like components and in the drawings:

FIG. 3 is a schematic diagram of a preferred embodiment of the fluid control system of the present invention and a matrix chart indicating operative fluid paths for selected positions of the manual valve;

FIG. 4 is a schematic diagram illustrating the fluid flow, with the manual selector-valve in reverse position;

FIG. 5 is a schematic diagram illustrating the fluid flow when the manual selector valve is in neutral position;

FIG. 6 is a schematic diagram illustrating fluid flow when the manual selector valve is in the park position.

DESCRIPTION OF THE PREFERRED EMBODIMENT

Figure 1:
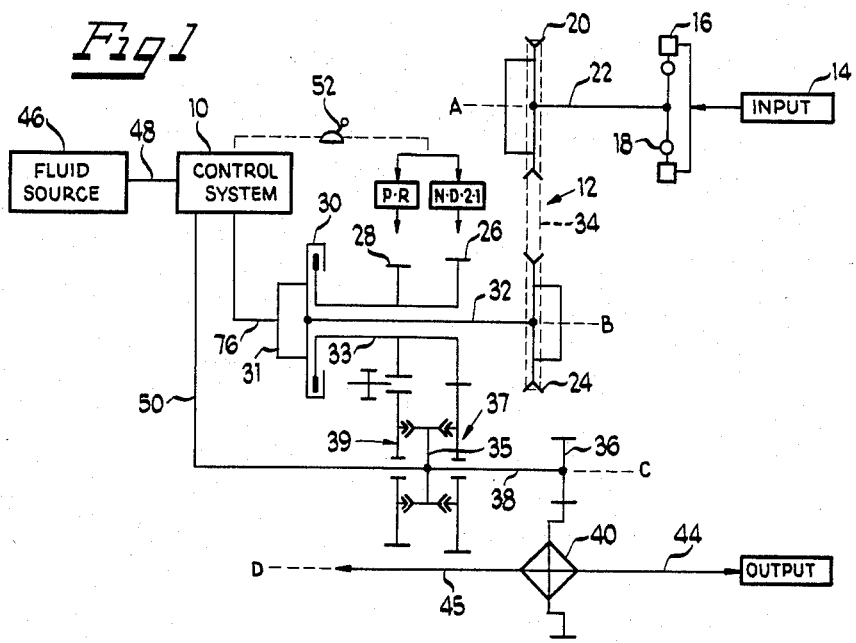
FIG. 1 is a stick diagram of a continuously variable transmission with a starting clutch and forward-reverse gear trains.

Control system 10 of the present invention is useful to regulate the components shown in FIG. 1 to govern the speed and direction of rotation of output members 44 45. The input shaft or member 14 is driven by any suitable means, such as an automotive engine (not shown). The power flow is from input member 14 through a flywheel 16 and a vibration damper 18 to an input shaft 22 of a continuously variable transmission (CVT) 12. Such a transmission 12, now well-known in the art, comprises a drive pulley 20 coupled to input shaft 22 on a first axis A, a driven or output pulley 24 coupled to another shaft 32, such as an output shaft, along a second axis B, and a flexible belt 34 of metal, elastomer, or other suitable material intercoupling the two pulleys. In general, each pulley includes an axially fixed flange and another flange, axially movable with respect to the first flange. The flange faces are tapered so that displacement of the movable flange adjusts the effective pulley diameter. By simultaneously changing the effective diameter of pulleys 20 and 24 in the opposite senses, the rotational speed of shaft 32 can be varied while the rotational speed of shaft 22 remains constant.

On the second or B axis, shaft 32 is coupled to one side of a fluid-engageable clutch 30, the other side of which is coupled to a sleeve shaft 33 concentric with shaft 32. When fluid under pressure is admitted into chamber 31, clutch 30 is engaged and drive is transferred from shaft 32 to concentric shaft 33. A synchronizer assembly 35 aligned on a third axis C, operates as means for selectively engaging one of the drive trains 37, 39; in the illustrated embodiment, 37 denotes the "forward" drive train, and 39 identifies the "reverse" drive train. Power from the selected drive train is transferred over shaft 38 to output gear 36, which in turn drives the ring gear (not shown) of differential assembly 40, to drive output shafts 44, 45 on the fourth axis D. For purposes of this explanation and the appended claims, either of shafts 44, 45 can be considered an output member which is driven when three conditions are present: (1) an input member (14, or 22, or 32) is driven; (2) clutch 30 is engaged; and (3) synchronizer assembly 35 is positioned to select one of the drive trains, 37 or 39.

Control system 10 communicates with a fluid source 46 through an input conduit means 48 to provide fluid at a line or controlled pressure to apply clutch 30, and further to selectively move synchronizer assembly 35 between first or second gear set positions 26 and 28 on shaft 33 through coupling means 50, such as a shift fork, operable by control system 10 to select one of drive trains 37, 39. Control system 10 is responsive to manual gear range selection means 52, which is movably operable to select between first drive train 37 and second drive train 39, and provides a mechanical (in this instance) signal to the control system 10.

Transmission assembly 12 is operable to transfer drive between shaft 22 and shaft 32. As indicated in FIG. 1, transmission 12 provides forward speeds in three ranges (D, 2 and 1) and a reverse range (R). The system also has a park position (P) and a neutral position (N). Transmission 12 provides a variable gear ratio, and additional gear reduction is provided through first and second drive trains 37, 39, as well as a forward and reverse gear means. Selection of first or second drive trains 37, 39 is provided by synchronizer assembly 35 utilizing a sliding synchronizer collar, as known in the art. Thus selection between forward and reverse in a vehicle may be obtained when such transmission assembly is utilized.

Figure 2:
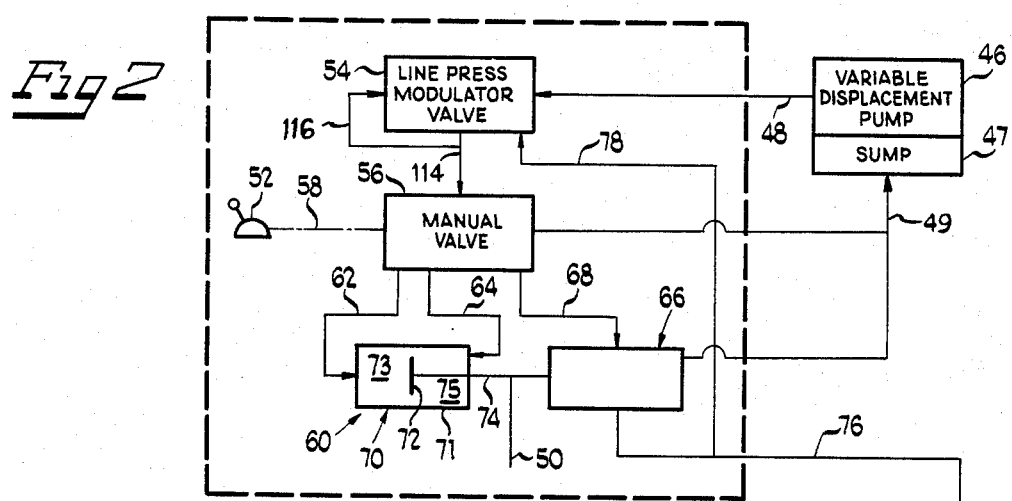
FIG. 2 is a block diagram of the fluid control system for the transmission of FIG. 1.

The present invention is specifically directed to the control system 10 utilized in conjunction with a CVT transmission assembly wherein clutch 30 of FIG. 1 is a slipping, fluid-actuated clutch coupled to shaft 32 and driven pulley 24, to effect engagement and disengagement between shafts 32 and 33. A diagrammatic illustration of a preferred embodiment of the control system 10 is shown in FIG. 2 in dashed outline. In FIG. 2 fluid source 46 is noted as a variable displacement pump with a sump 47 communicating fluid at a line pressure through conduit means 48 to a line pressure modulation valve 54 of control system 10.

A manual or first control valve 56 is connected and responsive to manual gear selector means 52 through a connecting or linkage means 58. Fluid at a given pressure is communicated from fluid source 46 to modulator valve 54 and thereafter to manual valve 56 through a second conduit means 114. Manual valve 56 communicates fluid to a fluid motor 60 through seventh and eighth conduits 62 and 64, and to a clutch or second control valve 66 through first conduit means 68. Return line or third conduit means 49 provides return flow communication between valves 56 and 66, and sump 47.

Fluid motor 60 defines a housing 70 with wall 71 and a slidable piston 72 contacting wall 71 therein. Wall 71 cooperates with slidable piston 72 to define first and second variable volume chambers 73 and 75 respectively in housing 70. A connecting means 74 extends between piston 72 and clutch control valve 66. Coupling means 50 is operatively connected to connecting means 74 such that its operation is simultaneous with that of the clutch control valve 66. Clutch control valve 66 communicates fluid to and from fluid actuated clutch 30 through a fourth conduit means 76. A pressure sensing fluid signal line or fifth conduit means 78 communicates between pressure modulator valve 54 and conduit means 76.

The above description broadly describes the operative means of the control system 10 and its actuating relationship within a CVT, however, FIGS. 3, 4, 5 and 6 detail the operational position of the valves 54, 56 and 66 as well as fluid motor piston 72 in the forward, reverse, neutral and park gear shift lever 52 positions. In addition, a matrix indicating the operative (+) and inoperative (−) fluid paths in these gear shift positions is shown in these FIGS. 3, 4, 5 and 6.

In FIG. 3 the gear selector means 52 (not shown) is positioned in the drive (forward) mode to move the manual control valve 56 into a similar valve internal register. Conduit means 48, communicating between fluid source 46 and line pressure modulator valve 54, provides fluid flow to control system 10. Modulator valve 54 is a spring biased slide valve having a housing 80 defining a cylindrical passage or bore 82 sealed at first and second ends 81, 83. Housing 80 defines a series of annular ports 84, 86, 88, 90 and 92 to provide fluid flow paths. Positioned in passage 82 is a cylindrical slide or spool 94 defining a series of lands 96, 98 and 100, along its length with cylindrical grooves 104 and 106 therebetween. Slide 94 with first and second ends corresponding to housing ends 81 and 83 further defines cylindrical extension 102 extending from land 100 and coaxial with groove segments 104 and 106. Housing 80 defines an annular slot 108 shown in proximity to first valve end 81, which slot 108 receives a snap-ring 110. A bias spring 112, shown as a coil spring, is positioned about extension 102 to abut snap-ring 110 and land 96. Conduit means 48 communicates between the fluid source 46 and port 90 of valve 54 to provide fluid flow to and through pressure modulator valve 54. Fluid conduit 114 provides fluid communication between pressure modulator valve 54, port 88, and manual control valve 56. Housing 80 at second end 83 cooperates with land 100 to define variable volume chamber 118. A pressure monitoring line or sixth conduit 116 is operable between conduit 114 and port 92 of valve 54 which port 92 provides fluid communication to a chamber 118 defined between housing second end 83 and land 100 in housing 80. Pressure sensing fluid conduit 78 provides a feedback loop to modulator valve 54 of the fluid line pressure between manual control valve 56 to clutch chamber 31.

Modulator valve 54 is illustrated in FIGS. 3 through 6 in two different positions, above and below the valve center-line. That is, the upper half of slide 94 is shown in a non-modulating or fluid bypass condition at clutch engagement, and in the lower half slide 94 is illustrated in the fully modulated position prior to clutch engagement.

Manual control valve 56 has housing 120 with sidewall 121 and a cylindrical slide or spool 122. Housing 120 defines a cylindrical passage 126 wherein cylindrical slide 122 is movable. Slide or spool 122 with a first end 124 defines a cylindrical extension 152 and is operable to be in register with a gear range indicator means 153 by gear selector 52 connected at first end 124. Slide 122 defines a series of lands 144, 146, 148 and 150 with grooves 154, 156 and 158 therebetween. Housing 120 defines a series of annular ports 128, 130, 132, 134, 136, 138, 140 and 142 which provide fluid flow paths between pressure modulator valve 54 and clutch control valve 66 when the slide 122 is in proper registry. The registry referred to is the relationship of lands 144, 146, 148, 150 and grooves 154, 156 and 158 of slide 122 in proper alignment with the valve ports to direct flow of fluid to alternate paths. These fluid flow paths through valve 56 are directed to clutch control valve 66, fluid motor 60 and exhaust lines to return fluid to a sump (not shown) of fluid source 46.

Clutch control valve 66 is connected to and operable by fluid motor 60. Housing 70 of fluid motor 60 defines a first end 200 having an endcap 202 positioned therein to contact sidewall 71 and seal chamber 73. Housing 70 has a base 206 sealing chamber 75, which base 206 defines a bore 208. Piston 72 contacting sidewall 71 is positioned and slidable in housing 70 which piston 72 defines a central bore 211 in axial alignment with bore 208.

Clutch control valve 66 includes a cylindrical housing 220, with sidewall 221 and a cylindrical slide or spool 222. Housing 220 defines annular ports 224, 226, 228, 230, 232, 234 and 235 and slide 222 defines grooves 236 and 238 with a longitudinal gap distance capable of bridging the distance between any two consecutive housing ports. In FIGS. 3, 4, 5 and 6 slide 222 has a first end 240, second end 242 and defines a central longitudinal through-bore 244. Slide 222 at first end 240 extends through bore 208 of base 206 and bore 211 of piston 72 into chamber 73 of fluid motor 60. First end 240 is a smaller diameter than slide 222 and thereby defines a shoulder 241 between the smaller and larger diameters of slide valve 222. Piston 72 is mounted on slide first end 240 to abut shoulder 241. Slide 222 at first end 240 in chamber 73 defines an annular groove 246 to receive a snap-ring 248 to retain piston 72 to slide 222 against shoulder 241. Thus slide 222 is movable by and with piston 72. Between housing 220 and fluid motor housing 70 slide 222 defines a pair of annular grooves 250, 252 longitudinally spaced along its surface to receive snap-rings 254 and 256, respectively. A coupling means 50, such as a shift fork, is mounted on slide 222 between snap-rings 254, 256 to be retained therein and thus movable with piston 72 and slide 222.

As illustrated in FIGS. 3, 4, 5 and 6 ports 138 and 142 of valve 56; 224, 234 of valve 66; and, both valve housing ends from which slides 122 and 222 protrude, provide fluid communication to the sump (indicated as X) of fluid source 46. Further, conduit means 68 communicates between manual control valve port 128 and clutch control valve port 228. Similarly, conduit means 62 communicates between ports 130 and 235, which port 235 provides a fluid flow path to fluid motor chamber 73 through longitudinal bore 244 of slide 222. A conduit 260 provides fluid communication between ports 136 and 230. Conduit means 64 communicates between fluid chamber 75 of fluid motor 60 and ports 132, 134 and 140 of manual control valve 56 by conduit tees 262, 264 and 266, respectively. Conduit 76 communicates between port 226 and starting clutch chamber 31 to provide actuating fluid at a pressure for clutch 30, as well as, providing a path for fluid return to the sump of fluid source 46.

Operation of the control system 10 to actuate a fluid actuated clutch 30 and synchronizer assembly 35 in a CVT is illustrated in FIG. 1. The synchronizer 35 is slidably operable between a forward 37 and reverse 39 gear set along axis C. Synchronizer 35 is movable by coupling means 50, a shift fork, connected to slide 222 of a fluid motor 60 and slide valve 66, which slide valve provides a fluid path to clutch 30. Manual valve slide 122 is operable by gear selector means 52.

The following discussion assumes fluid under pressure is provided to pressure modulator valve 54 from fluid source 46 via conduit 48.

In the forward select mode, as shown in FIG. 3, slide 122 of manual valve 56 is brought into register with a position illustrated as D or Drive in the matrix chart of the FIG. 3. In this drive mode of slide 94 pressure modulator valve 54 is in the reference position where land 100 is near second valve end 83 and fluid communication is provided through conduits 48, ports 90 and 88, groove 104 and conduit 114 to manual valve port 131.

Manual valve 56 in the drive (D) position provides fluid communication from port 131 past groove 154 of slide 122 to ports 128 and 130 and thus to fluid conduits 62 and 68, respectively. In this mode, fluid transfer from fluid source 46 through valve 56 is maintained between lands 144 and 146. Conduit means 62 communicates fluid at a modulated pressure at a shift change to port 235 of clutch control valve 66, which port 235 is in communication with end face 242 and longitudinal through-bore 244 of slide 222 to provide actuating fluid to fluid motor chamber 73. As shown in FIG. 3 this fluid communication to chamber 73 moves piston 72, thus slide 222 and coupling means 50, to a position noted as the forward mode. In this forward mode groove 236 of slide 222 is in position to communicate fluid from conduit means 68 and port 228 past groove 236 and port 226 to conduit 76 for communication to starting clutch chamber 31. Movement of the piston 72 simultaneously moves coupling means 50 and synchronizer means 35 to the forward mode. Note that the line pressure at starting clutch 30 is monitored or sensed by pressure modulator valve 54 through conduit 78.

The control system herein is illustrated and discussed as operative between a forward and reverse mode. This change of gears effects a change in control system 10 as shown in FIG. 5 where manual valve 56 passes through a neutral position noted as N in the matrix of FIG. 5. In this neutral position fluid is communicated through conduits 48, 114 and 62, past valves 54 and 56 to clutch control valve 66 and fluid motor chamber 73 to maintain piston 72 in the forward or first position. However, as shown, conduit 76, port 226, groove 236, port 228, conduit 68, port 128 and extension 152 cooperate to evacuate the fluid to the sump through the open end of manual valve 56. This evacuation path provides a means to exhaust the fluid from starting clutch 30 to relieve the clutch actuating fluid pressure, thereby causing clutch 30 disengagement. In the drive train discussed with reference to FIG. 1 such clutch 30 disengagement severs engagement between the input means 14 and the output 44, 45 that effectively produces a neutral position in the nomenclature known in the art.

The reverse mode of operation of the control system 10 is illustrated in FIG. 4. Fluid under pressure is provided to clutch 30 from fluid source 46 through conduit 48, pressure modulator valve 54, manual control valve 56 and clutch control valve 66. Manual control valve slide 122 is positioned in the reverse or R position by gear selector means 52 thereby allowing fluid flow from modulator valve 54 to be communicated by conduit 114 to port 131, past groove 154 of slide 122 to port 132 and through conduit means 262 communicates to conduit 64 and fluid motor chamber 75. Conduit means 262 has branch conduit means or tee 264 communicating fluid to port 134, groove 156, port 136 and conduit tee 260 to clutch control valve 66 port 230. Conduit means 262 joined to conduit 64 communicates fluid to fluid motor chamber 75 to move piston 72 and thus moves connecting means 50 and slide 222 to their reverse or second positions. In this reverse position slide 222 provides fluid under pressure to starting clutch chamber 31 through conduit 260, port 230, groove 238, port 232 and conduit 76. Further, as chamber 75 is being filled, a fluid exhaust path is provided to evacuate fluid motor chamber 73, through-bore 244, port 235, conduit means 62, port 130 and extension 152 to the sump connection at the open end of valve 56.

A park (P) position, as shown in FIG. 6, may be selected by the gear select means 52 thereby moving manual control valve slide 122 from the reverse gear position to provide fluid communication between ports 136 and 138 about groove 156. This fluid path communicates to the sump 47 of the fluid source 46, thereby relieving the fluid line pressure in conduits 260 and 76, starting clutch chamber 31 and groove 238 of clutch control valve 66. Piston 72 of the fluid motor 60 is maintained in the reverse position as is coupling means 50 and thus synchronizer assembly 35. The consequence of this valve and clutch arrangement is an understood neutral position, as the starting clutch 30 is again disengaged to prevent inadvertent power transfer to output 44, 45 of FIG. 1.

Pressure modulation valve 54 controls the fluid pressure from conduit 48 and fluid source 46 to fluid motor 60 until starting clutch 30 is engaged. This control of fluid pressure through the valve 54 until clutch engagement controls the rate of travel of piston 72 in fluid motor 60 to thus prevent a sudden, violet or objectionable operation or movement of synchronizer means 35. Further, this controlled travel rate of piston 72 limits sudden or objectionably high loads on coupling means 50. At clutch engagement feedback loop 78 provides fluid pressure to chamber 82, which fluid pressure acting with bias spring 112 is adequate to move slide 94 against the fluid pressure in chamber 118. In this latter position line pressure from fluid source 46 through ports 90 and 88, and groove 104 is provided through valve 54 to conduit 114, first valve 56, the fluid motor 60, second valve 66 and starting clutch 30.

At engine shutdown the input means 14 ceases to operate thereby disconnecting the power to fluid source 46. Under these circumstances it could be expected that the fluid pressure of fluid in conduit means 48 and fluid motor chamber 75 would dissipate. However, at input means 14 shutdown pressure could be expected to be maintained in chamber 75 for a short period of time.

The above description illustrates how a neutral and park position similar to the neutral position of a transmission with separate gearing is obtained. In this control system a forward or reverse gear selection is attained through control of a synchronizer assembly, and the neutral or park position is attained by disengagement of a starting clutch 30. The use of a separate parking gear, a separate lock-up or forward clutch and any brake throughout this system has been obviated by the ordered control of a clutch, synchronizer and gear select means.

Figure 7:
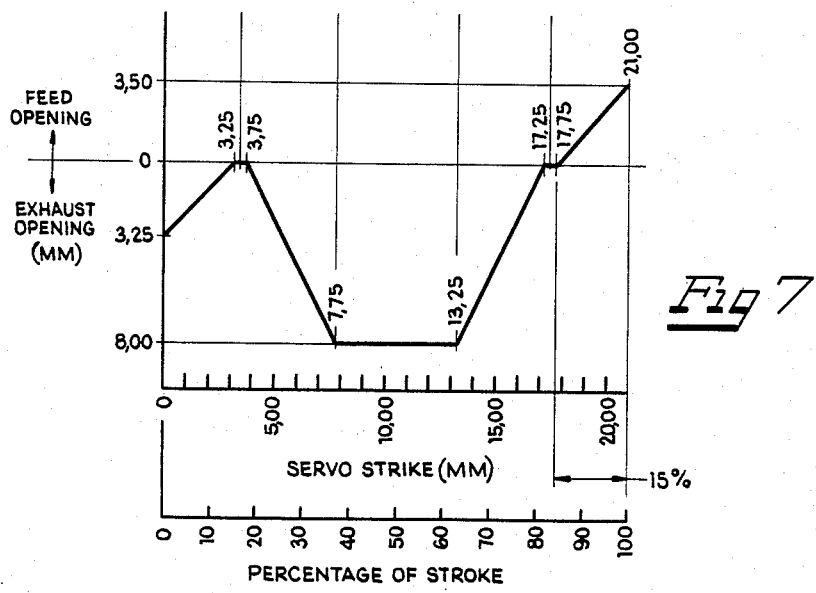
FIG. 7 is a graphical illustration of the cross-sectional area of exhaust from the clutch as a function of the travel of the fluid motor piston.

Indicative of the relative kinetic reaction rate and operational steps of the control system is the illustration of FIG. 7 where piston 72 of fluid motor 60 is illustrated as having a total travel distance between forward and reverse positions of 21 millimeters. This distance is indicated along the abscissa of the X-Y graph with a second or sub-axis indicating the travel as a percentage of the total travel. The opening, expressed as millimeters of linear opening of each annulus, for both the feed and exhaust are shown as a positive or negative ordinate about an origin displaced from but parallel to the abscissa.

The operation of the fluid motor 60 and its piston 72 from either the reverse or forward positions is as follows:

(1) In the reverse position the feed opening is at 3.50 mm and fluid is provided to maintain piston 72 and clutch 30 in their operating modes;

(2) When a change of gear is effected through selector means 52 the feed opening is closed and the fluid exhaust to sump is opened, but a second path providing fluid communication to clutch control valve 66 for clutch 30 is opened to fluid, therefore, the increase to the origin is shown;

(3) Thereafter, further openings to the sump for fluid exhaust are exposed to a maximum of 8 mm for a period of approximately 25 percent of the piston 72 travel where the clutch is fully disengaged;

(4) The next 20 percent of piston travel is correlated with a steep decrease in the exhaust opening until the origin is again closed;

(5) The final 15 percent of piston travel is associated with a rapid increase in the feed opening and a closure of fluid exhaust indicating fluid communication to the starting clutch 30 for actuation thereof.

The above example is for the purpose of illustration only and is not for purposes of limitation.

What is claimed is:

1. A fluid control system for use in the combination which includes an input member, a continuously variable transmission connected to drive the input member, an output member, first and second drive trains, a fluid-actuated clutch engageable for coupling said input member with the selected one of said drive trains, and means for selectively engaging one of said drive trains with said output member to establish a torque delivery path from said input member to said output member, said fluid control system comprising:

a first fluid control valve, a second fluid control valve, a pressure modulator valve with a first end and a second end, a first conduit communicating between said first and second control valves, an input conduit communicating between a source of fluid at a line pressure and said modulator valve, a sump for receiving fluid at a second pressure lower than said line pressure, a second conduit communicating between said modulator valve and said first fluid control valve, a third conduit communicating between said sump and said first and second fluid control valves, a fourth conduit communicating between said second fluid control valve and said fluid actuated clutch, a fifth conduit communicating between said fluid actuated clutch and said modulator valve first end, and a sixth conduit communicating between said second conduit and said second end of said modulator valve;

a fluid motor including a housing, a slidable piston positioned in said housing to define a first variable volume chamber on one side of said slidable piston and a second variable volume chamber on the other side of said slidable piston, connecting means operatively connecting said piston to said selective engaging means and to said second fluid control valve;

a seventh and an eighth conduit communicating between said first fluid control valve and said fluid motor first and second variable volume chambers, respectively, to supply fluid under pressure to move said fluid motor, said second fluid control valve, and said engaging means to effect selective engagement of one of said drive trains, movement of said second fluid control valve initially interrupting fluid flow to said clutch and thereafter completing a fluid flow path for fluid communication from said input conduit through said modulator valve and said first and second fluid control valves to move said fluid-actuated clutch to engagement only after selective engagement of one of said drive trains for completion of said torque delivery path between said input and output members, and fluid pressure from said fluid actuated clutch providing, through said fifth conduit, a biasing force to said modulator valve first end to control flow through said modulator valve.

2. A fluid control system as claimed in 1, wherein said first valve is manually operable for selecting between said first and second drive trains.

3. A fluid control system as claimed in claim 1, wherein said engaging means is a synchronizer.

4. A fluid control system as claimed in claim 1, wherein said clutch is operable between an engaged position and a disengaged position, and said first and second valves communicate fluid flow to said sump from said piston motor and said clutch at clutch disengagement.

5. A fluid control system as claimed in claim 1, wherein said second control valve is operable to provide fluid to said clutch for engagement only in either the first or second piston positions.

6. A fluid control system as claimed in claim 1, wherein said first and second variable volume chambers are correlatve with said first and second gear trains, respectively, and a change in position of said first fluid control valve transfers fluid flow between said first and second variable chambers to move said piston, during which piston movement fluid flow is communicated to the sump.

7. A fluid control system as claimed in claim 1, wherein movement of said engaging means commences after said piston has moved at least one-half the total piston travel distance.

8. A fluid control system as claimed in claim 1, wherein both first and second control valves must substantially complete their movement to effect a change of drive train engagement.

9. A fluid control system as claimed in claim 1, wherein said pressure modulator valve has a housing defining a bore, a cylindrical slide with a first and second end positioned in said bore, a bias spring positioned in the bore to act on said slide first end, said fifth conduit communicating fluid pressure from said fluid-actuated clutch to said first end, and said sixth conduit communicating between said second end and the fluid at a pressure in said second conduit, so that said modulator valve controls line pressure by balancing the fluid pressure acting on said slide second end and the sum of the spring and pressure forces acting on said slide first end.

10. A fluid control system as claimed in claim 9, wherein said pressure modulator valve communicates line pressure and fluid flow to said first valve at clutch engagement.

* * * * *